United States Patent [19]

Mell

[11] Patent Number: 4,955,962

[45] Date of Patent: Sep. 11, 1990

[54] REMOTE CONTROLLED FLYING SAUCER

[76] Inventor: Christian Mell, 211 South St., Port Jefferson, N.Y. 11777

[21] Appl. No.: 305,119

[22] Filed: Feb. 2, 1989

[51] Int. Cl.⁵ .............................................. B64C 29/00
[52] U.S. Cl. ............................... 244/23 C; 244/135 C; 137/263
[58] Field of Search .................. 446/34, 56, 46–48; 244/23 B, 23 C, 12.2, 23 R, 23 A, 23 D, 135 R, 135 C; 137/263, 255

[56] References Cited

U.S. PATENT DOCUMENTS

| | | | |
|---|---|---|---|
| 3,442,469 | 5/1969 | Davis | 244/23 C |
| 3,503,573 | 3/1970 | Modesti | 244/23 C |
| 3,946,970 | 3/1976 | Blankenship | 244/23 C |
| 4,457,476 | 7/1984 | Andresevitz | 244/23 C |
| 4,591,115 | 5/1986 | De Carlo | 244/135 C |
| 4,795,111 | 1/1989 | Moller | 244/23 C |

Primary Examiner—Mickey Yu
Attorney, Agent, or Firm—Terry M. Gernstein

[57] ABSTRACT

A flying saucer is remotely controlled and includes a plurality of angularly spaced apart guide flaps and motors all of which are operated independently of each other. Each of the motors has a fuel tank associated therewith and the fuel tanks can be interconnected with each other to share fuel or can be connected with a main fuel tank to receive fuel therefrom.

4 Claims, 2 Drawing Sheets

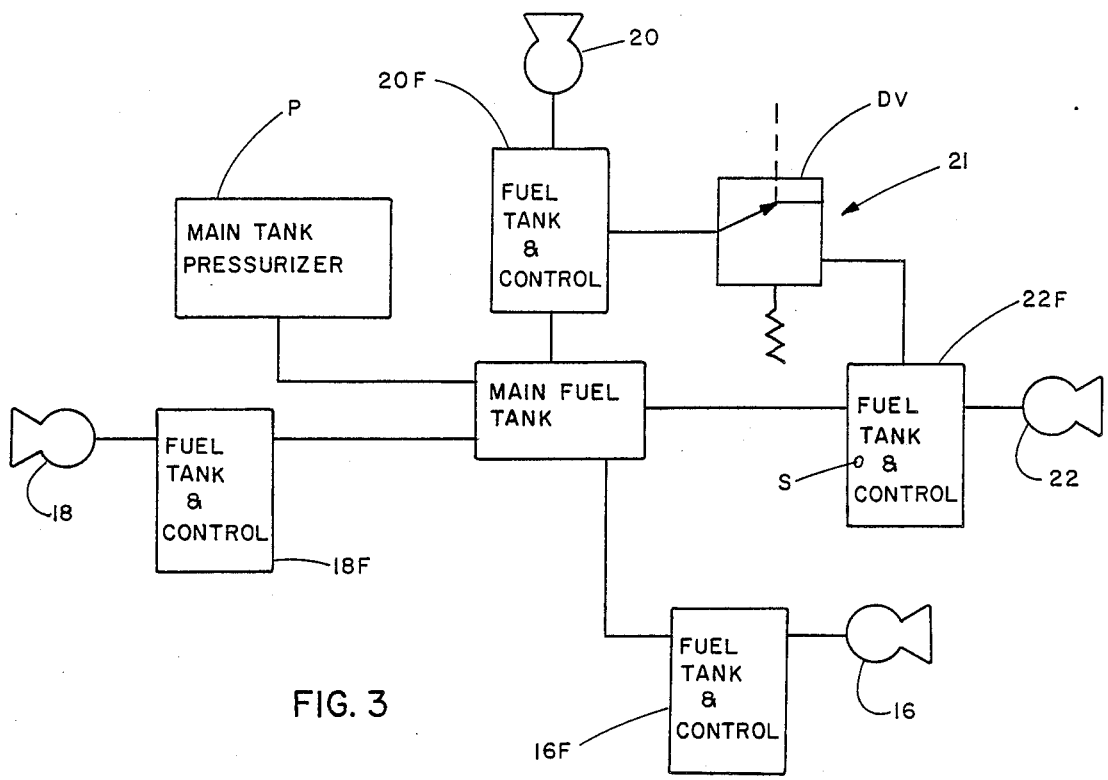
FIG. 3
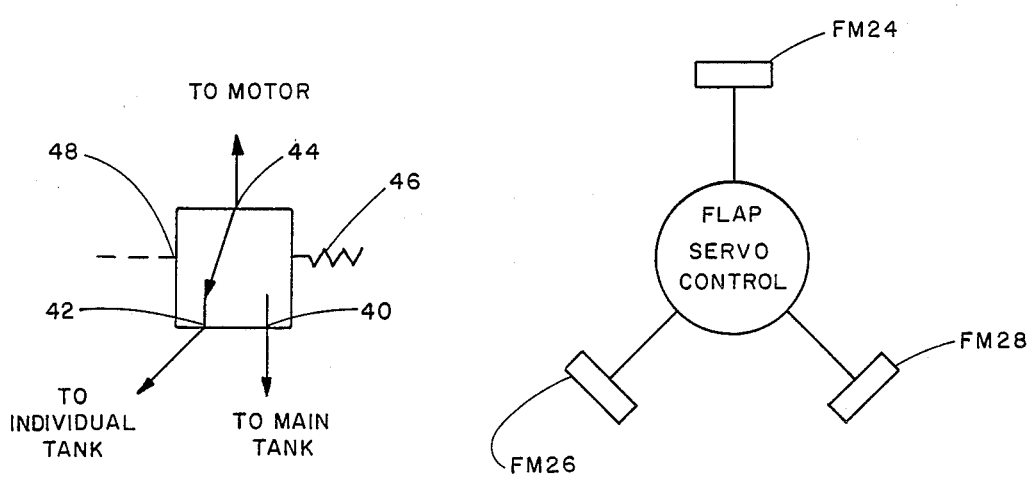
FIG. 4
FIG. 5

REMOTE CONTROLLED FLYING SAUCER

TECHNICAL FIELD OF THE INVENTION

The present invention relates to the general field of flying devices, and to the particular field of remotely controlled flying devices.

BACKGROUND OF THE INVENTION

Remotely controlled flying toys are well known, with remotely controlled airplanes being extremely popular examples of such toys. Such toys are the subject of clubs and a great deal of leisure time is often spent with such toys.

In addition to providing the object of a hobby, many of these remotely controlled airplanes can be used as models for future aircraft, and have even been used in combat situations as reconnaissance or delivery vehicles. These "toys" thus become useful and important vehicles which can each be valued in the millions of dollars.

The flying saucer has been the subject of many speculations both in the toy field and in the combat field because its silhouette can be designed to be attractive for the toy field and can be designed to avoid detection by radar in the combat situation. The flying saucer can also be quite maneuverable.

However, heretofore known flying saucer designs have been principally controlled by the toy aspect of such devices, see, for example U.S. Pat. Nos. 2,659,178, 3,508,360 and 4,262,911. Since these devices are principally used as toys, full control and maneuverability is not a primary consideration.

However, if such devices are to achieVe the immense popularity of remotely controlled airplanes, or are to achieve status as an important device for use other than as a toy, there is need for a means of providing these remotely controlled flying saucers with great maneuverability and versatility.

OBJECTS OF THE INVENTION

It is a main object of the present invention to provide a remotely controlled flying saucer which is highly maneuverable and versatile.

It is another object of the present invention to provide a remotely controlled flying saucer with a sophisticated fuel system.

SUMMARY OF THE INVENTION

These, and other, objects are achieved by a remotely controlled flying saucer which includes a plurality of individually controlled motors and a plurality of individually controlled guide flaps. Each motor and/or guide flap can be controlled independently of the other motors and/or guide flaps whereby a multiplicity of movements can be executed by the flying saucer. The flying saucer is further provided with a fuel system that can supply the motors on an individual basis and which can also share fuel supplies among the motors.

DESCRIPTION OF THE FIGURES

FIG. 3 is a schematic of the motor and fuel system of the flying saucer of the present invention.

FIG. 4 is a schematic of a remotely controlled valve which is used in conjunction with the control of each motor and fuel tank in the flying saucer of the present invention.

FIG. 5 is a schematic of a servo-control for the individual flaps of the flying saucer of the present invention.

DETAILED DESCRIPTION OF THE PREFERRED EMBODIMENT

Figure 1:
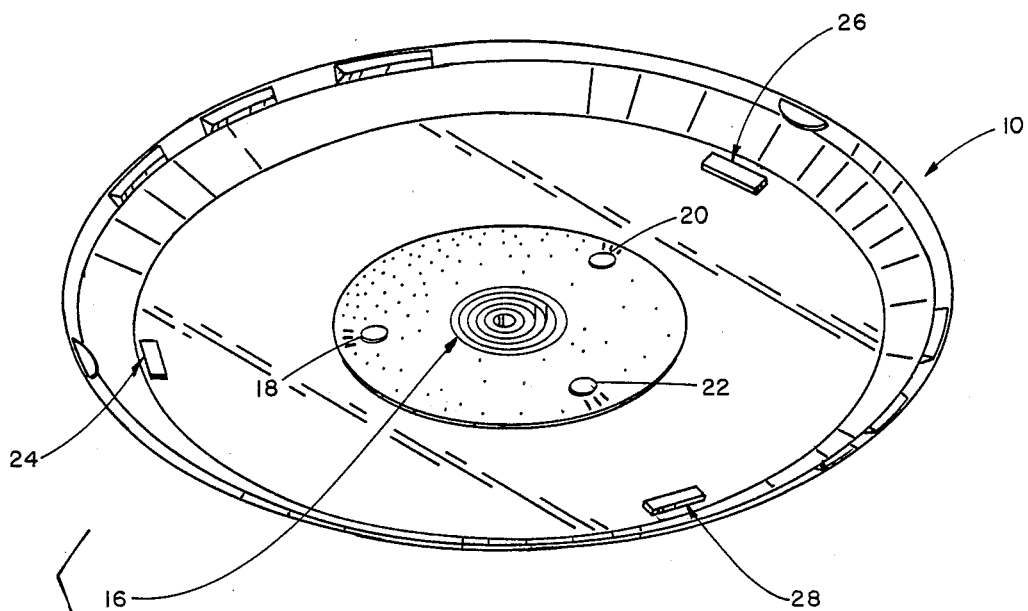
FIG. 1 is a bottom perspective view of the flying saucer embodying the present invention.
Figure 2:
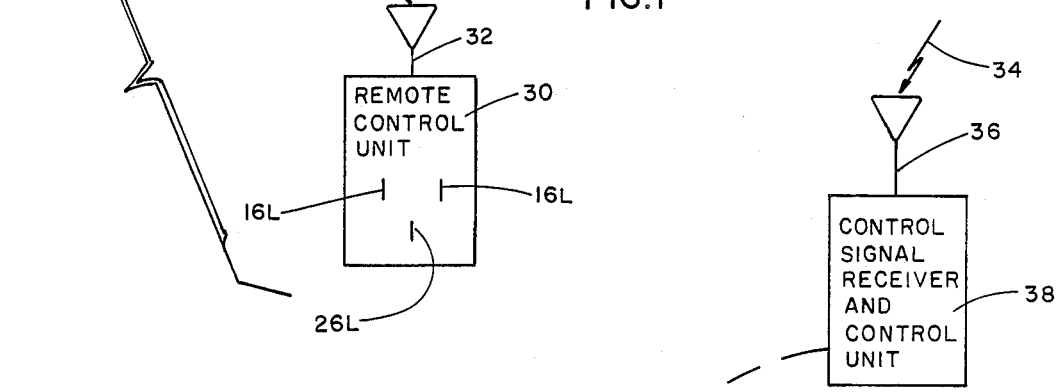
FIG. 2 is an elevational view of the flying saucer embodying the present invention.
Figure 2:
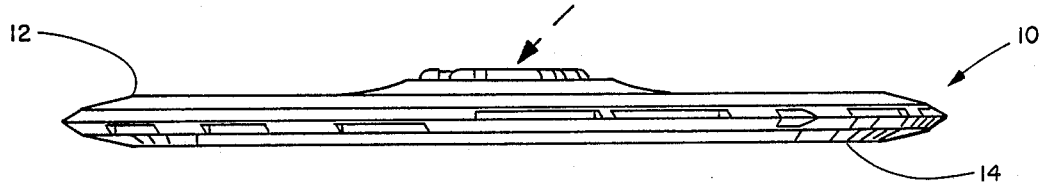

Shown in FIGS. 1 and 2 is a flying saucer 10 embodying the present invention. The flying saucer 10 includes a circular body which has a top surface 12 and a bottom surface 14 relative to its in-flight orientation. The top surface can include suitable decoration and aerodynamic styling.

The flying saucer 10 has a (main engine 16 located near the center thereof, and a plurality of maneuvering) engines 18, 20 and 22 at angularly spaced locations thereon. A plurality of controlling guide flaps 24, 26 and 28 are also located on the bottom surface of the flying saucer.

The flaps and engines of the flying saucer are attached and mounted using the means and connections familiar to those skilled in the art of airplane and rocket structures and with remote controlled airplane structures, and from disclosures such as that in U.S. Pat. No. 3,505,573 (where the hand controls are simply replaced by remotely controlled motor units) as well as from standard textbooks such as "Aerodynamics Propulsion Structures" by E. A. Bonney et al and published by D. Van Norstrand Co, Inc, in 1956, especially pages 405–496 in which design criteria are set forth.

The main engine 16 can be used to hover and to provide the main lifting force to the device; whereas, the maneuvering engines are used in conjunction with the guide flaps to maneuver the device as well as to provide lift if necessary. For example, the exhaust from the individual engines can be directed to provide force either by itself or can be directed to impact the guide flaps to control the device. Still further, by using two of the motors and flaps in one direction, the third flap can be used to raise one portion of the device upward with respect to the rest of the device or force another portion of the device downward. Various combinations of flaps and motors can be used to change direction and orientation of the device as will occur to those skilled in the art.

The motors are jet-type motors and the fuel can be pressurized gas or can be some other mixture, and can even be the combustible-type under some circumstances, such as in military use, or the like.

The motors and flaps of the flying saucer are controlled by a remote control unit 30 via an antenna 32 which sends an over-the-air signal 34 to an antenna 36 of a receiver 38 located in the flying saucer. The details of the remote control unit and the receiver will not be presented herein as they are well known in the art of remotely controlled airplanes. Suffice it to say, that the operator uses the remote control unit 30 to operate the flaps and the motors in combination and/or individually to maneuver the flying saucer using various buttons, guide sticks and knobs on the remote control unit while the circuitry in the receiver operates the proper element of the flying saucer. For example, the remote control unit 30 can include a lever 16L which controls the attitude of the main thrust motor 16 and another lever 16L' which controls the thrust of the main control motor 16, and the like for each motor as well as levers that control the orientation of each flap such as lever 26L which controls the flap 26.

The motors are controlled individually, and receive fuel from individual fuel tanks, such as fuel tank 18F associated with motor 18, tank 16F associated with motor 16, and the like. The motors and fuel tanks are operated according to signals received from the receiver, and this control is indicated in FIG. 3 by the box labeled "control" which is associated with each motor and each fuel tank. The control unit for each motor will initiate motor operation, control motor operation and shut down motor operation upon receiving an appropriate command from the receiver unit. Each fuel tank is pressurized to feed fuel to the motor, but can include a pump if so desired. Such pump will also be under the control of the associated control unit.

The fuel tanks are individually controlled, but can share fuel with each other or with a common main tank if necessary. That is, suppose, for example, that fuel tank 18F becomes empty and a signal is sent to the control unit associated with the motor 18 to operate that motor. In such a case, the control unit 18F will operate an appropriate valve so that the fuel tank 18F will receive fuel from either one of the other tanks, such as tank 16F for example, or directly from the main fuel tank. The fuel from tank 16F can be fed to the tank 18F via the main fuel tank, and such operation is indicated in FIG. 3; however, by using special conduits and valves, the tanks can be interconnected without the need of using the main tank. All of such connections are not shown for the sake of brevity; however, those skilled in fluid mechanics will readily see how to make such fluidic connections based on this disclosure.

Such diverting fluidic connections are exemplified by the connection 21 which fluidically connects fuel tanks 20F and 22F and which includes a diverter valve DV which can be remotely operated via the element 38, or which can be operated by fluid sensors associated with the tanks, such as a fuel level sensor S in fuel tank 22F. The sensors can be of the type used in automobiles or the like. It is noted that any of the valves discussed herein can be operated either remotely or using fluid level sensors in any or all of the tanks so that the fuel will be taken from the tank that is fullest, for example, or from the next adjacent tank, or one of the other tanks if all of the tanks are fluidically interconnected or the like. Any suitable control functions can be used to control when and where fuel is taken for each tank.

The main tank can be pressurized as from a special tank, such as tank P, and such pressure can be conducted to each of the individual tanks if necessary. A special pump can be used in place of the tank P if so desired.

An example of a valve that is suitable for use in conjunction with the control of each motor is shown in FIG. 4. This valve is a remotely controlled valve, but could be any other suitable valve. The valve includes a fluid connection 40 to the main tank, a fluid connection 42 to the individual tank, and a fluid connection 44 to the motor. The valve has a biasing means, such as a spring 46 which biases the valve to connect the individual tank to the motor, and also has a remote control connection 48 to a solenoid or the like which overcomes this bias to move the valve to fluidically connect the motor with the main tank or with a manifold to which the other individual tanks are fluidically connected so that fuel can be shared among the individual motors as necessary As mentioned above, the diverter valve DV can be similar to the valve shown in FIG. 4 to be biased closed and opened to fluidically connect the fuel tanks 20F and 22F by actuation of a control means which moves the valve against the bias exerted thereon. The remote control of the valves is via the signal receiving and control unit 38 on board the device.

It is noted that other valves and/or combinations of fluid control means can be used without departing from the scope of the instant invention and the valve shown in FIG. 4 is merely an example, and is not intended as being limiting.

As above discussed, the guide flaps are also individually controlled, and such individual control is indicated in FIG. 5. The flaps are controlled by individual motors, indicated in FIG. 5 by the boxes $FM_{24}$, $FM_{26}$ and $FM_{28}$, and such motors are remotely controlled by the hand set 30 via the receiver and control unit 38. The preferred embodiment of the flap controls is a servo-mechanism, and this is indicated in FIG. 5; however, other suitable forms of control can also be used without departing from the scope of the present invention. The main control associated with the individual flaps can receive some input from the motor controls so the overall device can be stabilized, and this is why the main control is indicated in FIG. 5 as being a servo-control. The flaps are also controlled by the signal receiver and control unit 38.

Suitable power sources, such as batteries or the like are included in the hand set 30 and on board the vehicle 10.

I claim:
1. A remotely controlled flying saucer comprising:
(A) a circular body having a top surface and a bottom surface;
(B) a propulsion system which includes
 (1) a plurality of jet motors on said bottom surface,
 (2) a plurality of individual fuel tanks mounted on said body,
 (3) individual conduit means connecting each individual fuel tank of said plurality of fuel tanks to an individual jet motor of said plurality of jet motors,
 (4) a main fuel tank mounted on said circular body,
 (5) individual fuel tank control means connected to each individual fuel tank,
 (6) main fuel tank conduit means fluidically connecting each individual fuel tank control means to said main fuel tank to fluidically connect each individual jet motor to said main fuel tank,
 (7) a valve connected to the control means of each individual tank to be operated to conduct fuel from said main fuel tank to said each individual tank when the control means associated with such each individual tank is activated,
 (8) individual fuel tank fluidic connection means connecting each individual fuel tank to another individual fuel tank and including
  (a) a normally closed diverter valve which establishes fluid communication between said each individual fuel tank and said another tank when said diverter valve is opened,
  (b) a fuel level sensor in each individual fuel tank which senses fuel level in said each individual fuel tank and generates a signal when said fuel level is below a predetermined level, and
  (c) control means for opening said diverter valve upon receiving a signal from said fuel level sensor;

(C) a plurality of direction controlling guide flaps on said bottom surface;

(D) motor control means on said body and connected to each jet motor for operating said each motor independently of all other jet motors;

(E) guide flap control means on said body and connected to each guide flap for operating said each guide flap independently of all other guide flaps;

(F) a signal receiving means connected to said guide flap control means, to said individual fuel tank control means, and to said motor control means for receiving over-the-air motor control signals and for receiving over-the-air flap control signals and for receiving over-the-air individual fuel tank control unit operating signals and operating said motors, said individual fuel tank control units and said flaps in response to receipt of such over-the-air signals; and (G) main control means which is adapted to be located remotely of said body and which includes motor control signal transmitting means which transmits motor control signals over-the-air to said signal receiving means, guide flap control signal transmitting means which transmits guide flap control signals over-the-air to said signal receiving means, and individual fuel tank control means signal generating means which transmits individual fuel tank control signals over-the-air to said individual fuel tank control means.

2. The remotely controlled flying saucer defined in claim 1 further including a main thrust motor on said body, a main thrust motor control means, said signal receiving means having a main thrust motor control signal receiving means, with said main control means further including a main thrust motor control signal transmitting means which transmits main thrust motor control signals over-the-air to said signal receiving means.

3. The remotely controlled flying saucer defined in claim 2 wherein said motors are spaced apart angularly about said body.

4. The remotely controlled flying saucer defined in claim 3 wherein said guide flaps are spaced apart angularly about said body.

* * * * *